No. 624,785. Patented May 9, 1899.
W. B. GRAY.
PLOW.
(Application filed Aug. 4, 1898.)

(No Model.)

WITNESSES:
Edward Thorpe
J. Fedetcher

INVENTOR
W. B. Gray
BY
ATTORNEYS.

UNITED STATES PATENT OFFICE.

WILLIAM BREEZE GRAY, OF ASHLAND, OREGON.

PLOW.

SPECIFICATION forming part of Letters Patent No. 624,785, dated May 9, 1899.

Application filed August 4, 1898. Serial No. 687,713. (No model.)

*To all whom it may concern:*

Be it known that I, WILLIAM BREEZE GRAY, of Ashland, county of Jackson, and State of Oregon, have invented a new and useful Improvement in Plows, of which the following is a full, clear, and exact description.

The object of my invention is to provide a plow especially adapted for hillside-work, wherein either one of two plows may be raised or lowered independently and the line of draft directed to accord with the draft-line of the plow brought into operation.

Another object of the invention is to provide for an independent adjustment of either supporting-wheel, and further to provide for the adjustment of the trail or guard wheel into the path of the plow in service.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
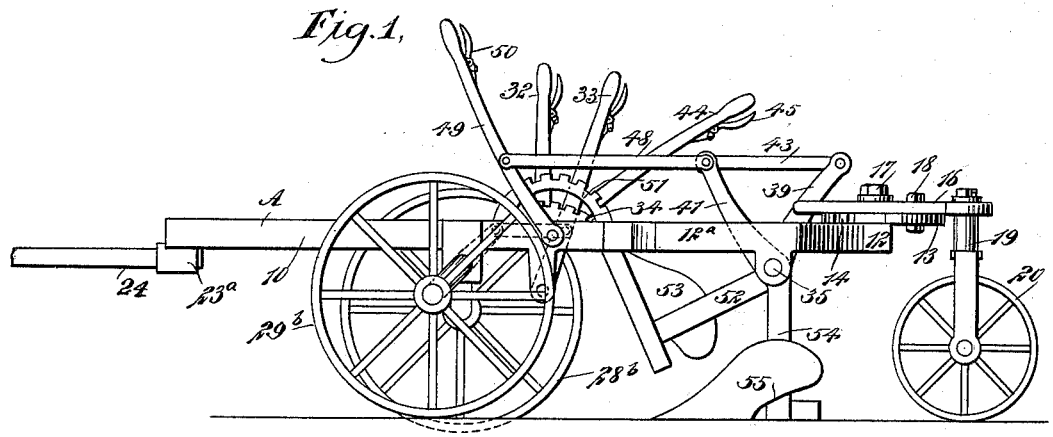
Figure 2:
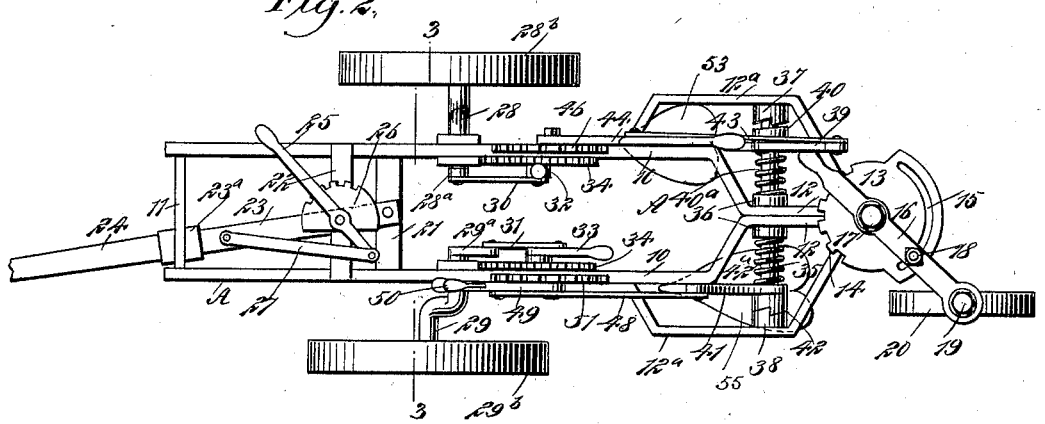
Figure 3:
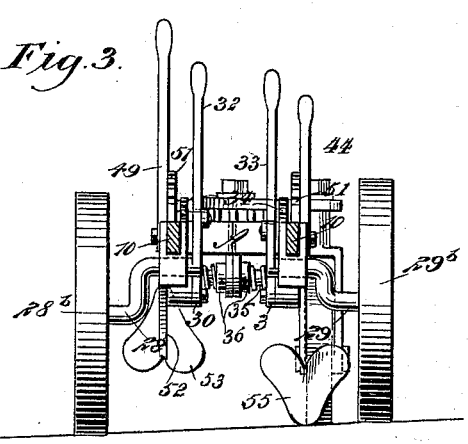

Figure 1 is a side elevation of the improved plow, illustrating one of the shares elevated and the other in position for operation. Fig. 2 is a plan view of the plow as illustrated in Fig. 1, and Fig. 3 is a transverse section taken practically on the line 3 3 of Fig. 2.

The frame A of the machine consists of two side pieces 10, placed parallel and separated a suitable distance, the said side pieces being made to meet at their rear ends on a line drawn about centrally between them, forming thereby rear extensions 12, and the forward ends of the side pieces 10 are connected by a cross-bar 11, as shown best in Fig. 2. On the extensions 12 of the frame a horizontal rack 13 is preferably secured, which rack is shown as of circular form, and is provided at its forward edge with teeth 14, while near its rear edge a slot 15 is made, and a lever 16 is fulcrumed upon the central portion of the said rack 13, the pivot-pin being designated as 17, and the lever 16 is guided in its movement on the rack by means of a pin 18, passed through the lever and into the slot 15. The lever is provided also with a thumb-latch (not shown) or a latch of any suitable description, arranged for engagement with the aforesaid teeth 14.

At the rear end of the lever 16 a standard 19 is carried, the lower end of the standard being bifurcated, and in the bifurcated portion of the said standard 19 a trail or guide wheel 20 is mounted to turn. This trail or guide wheel may be carried to one side or the other of the frame by manipulating the lever 16.

Near the forward end of the frame A a cross-bar 21 is located at or near the bottom portion of the said frame, and in advance of the cross-bar 21 a second cross-bar 22 is secured to the upper portion of the frame, as shown best in Fig. 2. A bar 23 is pivoted at its rear end upon the cross-bar 21, and the said bar 23 carries a socket 23$^a$ at its forward end, in which socket the pole or tongue 24 is introduced; but the pole or tongue may be carried rearward and pivoted to the cross-bar 21, in which event the bar 23 is omitted. A lever 25 is fulcrumed upon the forward and upper cross-bar 22, being adapted to travel over a rack 26, and the said lever is provided with suitable locking devices (not shown) for engagement with the teeth of the rack 26. The rear and shorter end of the lever 25 is pivotally connected either with the pole or tongue 24 or with its pivoted carrying-bar 23, so that by the manipulation of the lever 25 the pole or tongue may be carried toward the right or the left hand side of the frame, according to which side the line of draft is to be directed.

The frame carries two crank-axles 28 and 29, one of the said crank-axles being journaled in each side bar 10 of the frame at or near its center. A supporting-wheel 28$^b$ is mounted on the crank-axle 28 and a corresponding supporting-wheel 29$^b$ is mounted on the crank-axle 29, both wheels being secured to the axles to which they belong. The crank-axle 28 within the frame is provided with a crank-arm 28$^a$ and the crank-axle 29 is provided with a similar crank-arm 29$^a$, as is best shown in Fig. 2. The crank-arm 28$^a$ of the crank-axle 28 is provided with a link 30 and the arm 29$^a$ of the crank-axle 29 is provided with a pivotally-attached link 31. The link 30 of the axle 28$^a$ is pivotally connected with a lever 32, suitably fulcrumed on the frame, and the link 31 of the axle 29 is pivotally connected with a corresponding lever 33, suitably fulcrumed upon the opposite side member of the frame. Each lever is preferably provided with a suitable thumb-latch, and the said thumb-latches are arranged for engagement with a rack 34. By means of the levers 32 and 33 either one or the other of the supporting-wheels may be raised or lowered, as occasion may demand, the adjustment of each supporting-wheel being independent of the other.

It may here be remarked that bowed side pieces $12^a$ are attached to the side portions 10 of the frame A and to the extensions 12 of the said main frame, as shown in Fig. 2. In these side extensions $12^a$ of the main frame and in the central extensions 12 of the said main frame a spindle 35 is fixedly secured, the said spindle being provided with collars 36 at each side of the extensions 12. A clutch 37 is secured to one end of the spindle near the extension $12^a$ on the frame at that end, while near the extension at the opposite side of the main frame a corresponding clutch 38 is firmly secured to the said spindle. At the right-hand side of the machine a crank-arm 39 is mounted to turn on the spindle 35, the crank-arm being provided with a clutch-face 40, adapted for engagement with the right-hand clutch 37, and the clutch-face 40 of the crank-arm 39 is normally held in engagement with the fixed clutch 37 by means of a spring $40^a$, coiled around the said fixed spindle 35. A second crank-arm 41 is loosely mounted upon the left-hand end portion of the fixed spindle 35, and the left-hand crank-arm 41 is provided with a clutch-face 42, normally held in engagement with the clutch 38, through the medium of a spring $42^a$, likewise coiled on the fixed spindle 35, as shown in Fig. 2.

The right-hand crank-arm 39 is connected by a link 43 with a lever 44, fulcrumed on the main frame A, the said lever being provided with a thumb-latch 45, arranged to engage with a rack 46, and a link 48 connects the left-hand crank-arm 41 with a second lever 49, pivoted at the opposite side of the frame, the lever 49 being provided with a thumb-latch 50, arranged to engage with the teeth of a rack 51.

A plow-shank 52 is attached to the right-hand crank-arm 39, the said crank carrying a plow 53 of any suitable description, and a similar shank 54 is attached to the left-hand crank-arm 41, carrying a plow 55. When a lever 44 or 49 is carried rearward, the plow will be carried out from the ground, as shown in Fig. 1, and the clutches 37 and 40, connected with the shank of the said plow, will be out of engagement, as in Fig. 2. When, however, a lever 44 or 49 is carried forwardly, the clutches 38 and 42 will be in engagement, as shown in Figs. 1 and 2, and the plow controlled by the said lever will be carried downward to an engagement with the ground. When a plow-share is in position to engage with the ground, the supporting-wheels are adjusted to render the action of the said share effective, the trail-wheel 20 is then carried to the side of the frame at which the working plow is located, and the pole or tongue 24 is shifted so as to bring the line of draft in alinement with the line of draft of the said working plow. When a plow is dropped to the ground, the clutches belonging to that plow will interlock, as shown by the clutches 38 and 42 in Fig. 2, and will prevent the plow being raised until it is purposely elevated by the manipulation of its controlling-lever.

The device is exceedingly simple, it is durable and economic, and is capable of effective operation particularly on a hillside. As heretofore stated, each plow may be adjusted independently, each supporting-wheel may likewise be adjusted independently, and the trail or guide wheel and the tongue may be adjusted to bring the draft action at that side of the machine carrying the working plow.

Having thus described my invention, I claim as new and desire to secure by Letters Patent—

1. A plow, comprising a wheel-supported frame, means for independently adjusting the supporting-wheels, a laterally-adjustable tongue, plows carried by the frame, capable of independent movement to and from the ground, a trail or guide wheel, and means for adjusting the trail or guide wheel to a longitudinal alinement with either plow, as specified.

2. A plow, comprising a frame, independently-mounted supporting-wheels, means for adjusting said wheels, two plows pivotally mounted in the frame, means for swinging said plows into and out of operative position, a tongue adjustable laterally, and a trail-wheel at the rear of the frame, and mounted on a swinging support, whereby the wheel can be brought into alinement with either plow, substantially as described.

3. In a plow, the combination with a wheel-supported frame, of a pivoted arm provided with a clutch-face, a plow carried by said arm, a stationary clutch, a spring for forcing the clutch-face of the arm in engagement with the fixed clutch, and means for operating said pivoted arm, substantially as described.

4. In a plow, the combination with a wheel-supported frame, of a transverse rod or spindle secured in the rear part of the frame, crank-arms pivotally mounted on the said rod or spindle and each provided with a clutch-face, a plow carried by each crank-arm, fixed clutches with which the clutch-faces of the crank-arms engage, springs on the spindle or rod and bearing against the crank-arms, operating-levers, and connections between the levers and crank-arms, substantially as described.

5. In a plow, the combination with a wheel-supported frame, and plows carried by the frame and capable of independent movement to and from the ground, of a trail-wheel mounted in a swinging support at the rear end of the frame, whereby the trail-wheel can be brought into longitudinal alinement with either plow, substantially as described.

6. In a plow, the combination with a wheel-supported frame, and plows carried by the frame and capable of independent movement to and from the ground, of a lever pivoted between its ends to the rear part of the frame on a vertical pivot, a standard secured to one end of the lever, a trail-wheel mounted in the standard, and means for locking the lever in position, substantially as described.

7. In a plow, the combination with a wheel-supported frame, and plows carried by the frame and capable of independent movement to and from the ground, of a horizontal rack at the rear of the frame, said rack having teeth on its forward edge and provided with a curved slot near its rear edge, a lever fulcrumed between its ends on the rack on a vertical pivot and provided with a pin working in the slot of the rack, a standard secured to one end of the lever, a trail-wheel mounted in the standard, and a latch carried by the lever for engaging the teeth of the rack, substantially as described.

WILLIAM BREEZE GRAY.

Witnesses:
J. H. HURN,
HELEN R. STANLEY.